(12) United States Patent
Gallego Juárez et al.

(10) Patent No.: US 6,233,844 B1
(45) Date of Patent: May 22, 2001

(54) DEHYDRATION METHOD AND DEVICE

(75) Inventors: Juan A. Gallego Juárez, Madrid (ES);
Tom Yang, Natick, MA (US);
Fernando Vázquez Martinez, Madrid
(ES); Juan Carlos Galvez Moraleda,
Madrid (ES); **Gérman Rodriquez
Corral**, Madrid (ES)

(73) Assignee: **Consejo Superior de Investigaciones
Cientificas** (ES)

( * ) Notice: Subject to any disclaimer, the term of this patent is extended or adjusted under 35 U.S.C. 154(b) by 0 days.

(21) Appl. No.: 08/945,673

(22) PCT Filed: May 7, 1996

(86) PCT No.: PCT/EP96/01935

§ 371 Date: Jun. 11, 1998

§ 102(e) Date: Jun. 11, 1998

(87) PCT Pub. No.: WO96/35340

PCT Pub. Date: Nov. 14, 1996

(30) Foreign Application Priority Data

May 9, 1995 (BE) .................................................. 09500420

(51) Int. Cl.[7] ..................................................... F26B 5/14
(52) U.S. Cl. ................................. 34/401; 34/252; 34/256;
34/262; 34/481; 34/509; 34/164; 34/215;
34/216; 34/231; 34/236
(58) Field of Search ............................. 34/401, 426, 481,
34/498, 509, 164, 207, 212, 215, 216, 219,
231, 236, 250, 252, 254, 256, 262, 255

(56) References Cited

U.S. PATENT DOCUMENTS

| 2,344,754 | * | 3/1944 | Vang | 34/255 |
|---|---|---|---|---|
| 3,175,299 | * | 3/1965 | Boucher | 34/279 |
| 3,592,395 | * | 7/1971 | Lockwood | 241/18 |
| 3,641,680 | * | 2/1972 | Candor et al. | 34/252 |
| 4,071,960 | * | 2/1978 | Bowles | 34/585 |
| 4,334,366 | * | 6/1982 | Lockwood | 34/425 |
| 5,020,237 | * | 6/1991 | Gross et al. | 34/265 |
| 5,114,560 | * | 5/1992 | Senapati et al. | 201/299 R |
| 5,135,122 | * | 8/1992 | Gross et al. | 219/10.55 A |
| 5,247,801 | * | 9/1993 | Jaxmar et al. | 62/63 |
| 5,292,421 | * | 3/1994 | Senapati et al. | 204/300 |
| 5,581,907 | * | 12/1996 | Kuma et al. | 34/92 |
| 5,846,585 | * | 12/1998 | Ohmura et al. | 426/241 |

* cited by examiner

*Primary Examiner*—Pamela Wilson
(74) *Attorney, Agent, or Firm*—Bacon & Thomas PLLC

(57) ABSTRACT

An apparatus and method for dehydrating solid products containing moisture, particularly food products, includes a hot gas stream device for creating a hot gas stream over the products to be dehydrated and an ultrasonic wave emitting system for directing ultrasonic waves over the products. The dehydrating apparatus includes a closed housing and at least one conveyor mounted in the housing for transporting the products. The ultrasonic wave emitting system includes a plurality of ultrasonic diffusing plates which are connected to sound wave generators and are in direct contact with the products.

18 Claims, 2 Drawing Sheets

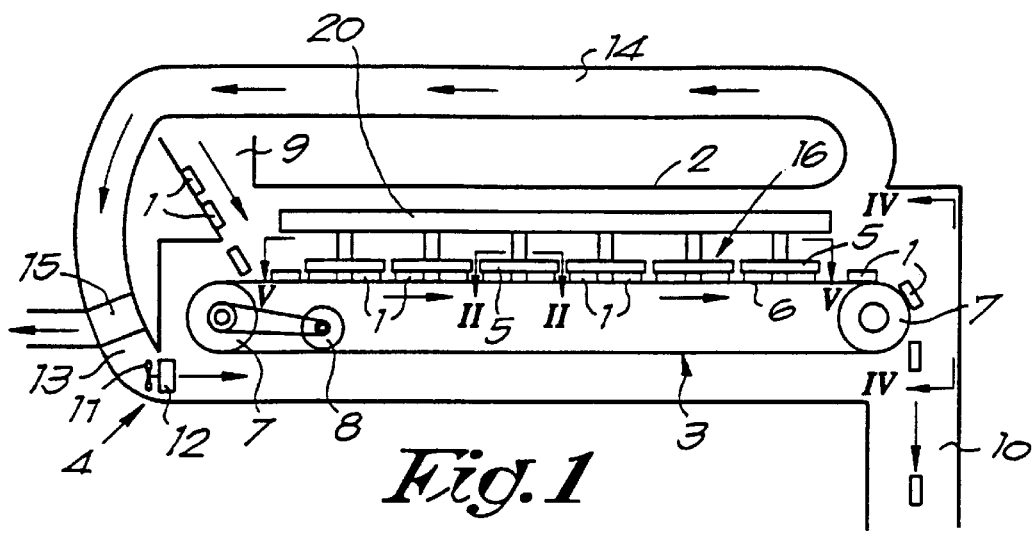
*Fig.1*
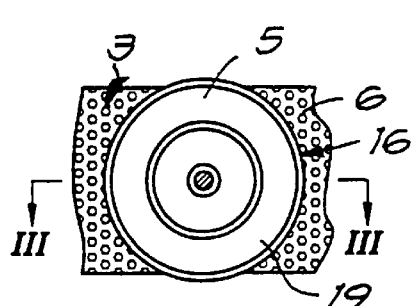
*Fig.2*
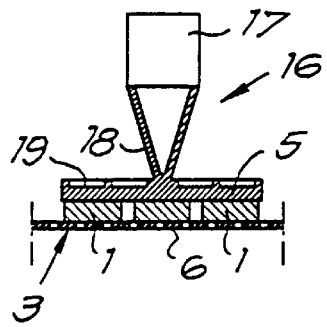
*Fig.3*
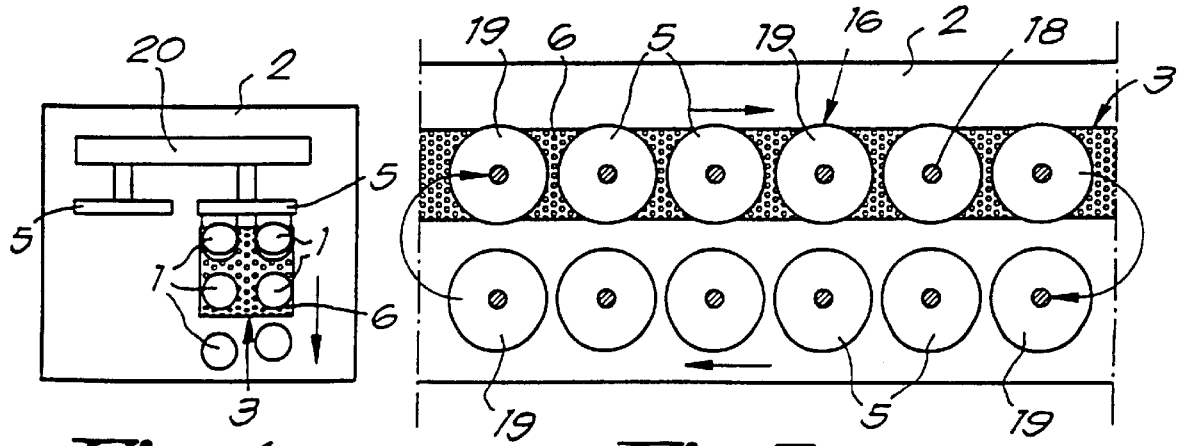
*Fig.4*  *Fig.5*

DEHYDRATION METHOD AND DEVICE

BACKGROUND OF THE INVENTION

1. Field of the Invention

The invention relates to a method for dehydrating solid products containing moisture, in particular food products, according to which a hot gas stream is guided over the products while they are exposed to ultrasonic waves.

2. Description of the Related Art

Traditional methods for desiccating or dehydrating food products by a forced stream of hot air are relatively economical, but the elimination of the interior moisture takes a relatively long time. Moreover, high temperatures may damage the food, which in certain cases may change the color, the taste, the possibility of rehydration and the nutritional value.

Other methods may exclude these disadvantages, but certain methods, such as freeze-drying, are expensive, and others, such as drying by pulverization, are only application to liquids or pastry.

It is known that supplying vibrational energy may stimulate the dehydration.

For instance, U.S. Pat. No. 2,297,726 describes a method according to which atomized products are subjected to sound waves and subsequently to an evaporation.

U.S. Pat. No. 2,344,754 describes dehydration by a sonic or ultrasonic vibration in combination with high frequency electric currents.

U.S. Pat. No. 3,175,299 relates to the desiccation of sugar crystals by sound waves.

According to U.S. Pat. No. 3,592,395, deposits or fine powders are desiccated in an agitated fluidized bed. The agitation tends to reduce the size of the particles of the product, which diminishes the commercial value. Moreover, this agitation may damage delicate products.

Another application of sonic vibration for dehydrating is described in U.S. Pat. No. 3,641,680. The electrostatic removal of the moisture from a humid lye or from deposits is supported by vibration.

The combination of hot air and sound waves for dehydrating food products is already known from U.S. Pat. No. 4,334,366. The food products are introduced in a perforated rotating drum and heated by a pulsating burner providing sonic vibrations. The sonic energy, or more particularly the succession of compression-expansion cycles which is provokes, removes the moisture from the surface of the products. The hot air is necessary for removing, by convection, the moisture from the interior of the products. The efficiency of the dehydration increases with the temperature; therefore, the majority of such devices having a pulsating burner provide for an increased temperature, for example, of more than 1000°.

At this high temperature, the drying time is a few fractions of a second which makes it difficult to control the working conditions and renders the method unsuitable for dehydrating heat-sensitive food products. The application of lower temperatures, however, strongly diminishes the efficiency of the method.

The above-mentioned method causes sound leaks towards the environment above 140 dB which necessitates a considerable silencing. Moreover, the consistency of the food products is difficult to preserve.

According to U.S. Pat. No. 4,708,159, this method has been improved, but its application has been limited to solutions or deposits.

Consequently, it is known that sound vibration improves the efficiency of dehydration, but in most cases, particularly for desiccating food products, the improvement has proved to be insufficient to justify commercialization.

SUMMARY OF THE INVENTION

The object of the present invention is to remedy these disadvantages and to provide a dehydration method which is simple and efficient, and thus also rapid and, consequently, economically feasible, and which in particular dehydrates food products without deteriorating them.

This object is achieved by the fact that ultrasonic waves are diffused in the product by an intermediary of vibrating plates which are put into direct contact with the products.

Preferably, a static pressure is exerted on the products by these plates.

The temperature of a hot gas may be below 60° C. and is, for example, approximately 25° C.

The invention also relates to an apparatus which is particularly suitable for realizing the above-described method according to the invention.

Thus, the present invention relates to an apparatus for dehydrating solid products containing moisture, particularly food products, comprising a hot gas stream device arranged to create a hot gas stream over the products to be dehydrated and an ultrasonic wave emitting system arranged to direct ultrasonic waves over the products. The apparatus also comprises a closed housing, at least one conveyor mounted in the housing for transporting the products to be desiccated in a transport direction. The ultrasonic wave emitting system comprises a plurality of ultrasonic diffusing plates which are connected to sound wave generators and are in direct contact with the products.

Preferably, the diffusing plates are mounted in such a way as to exert a static pressure on the products.

The diffusing plates may be stationary in the transport direction of the conveyor. The distance between the conveyor and the plates is adjustable. The plates may be mobile in the transport direction, in which case a driving device is provided to move the plates at the same speed as the products on the conveyor.

BRIEF DESCRIPTION OF THE DRAWINGS

For clarity's sake, two embodiments of a dehydration method and apparatus according to the invention are described hereafter, as an example only without being limitative in any way, reference being made to the accompanying drawings, in which:

FIG. 1 is a schematic longitudinal cross-section of an apparatus for dehydrating food products according to the invention;

FIG. 2 represents a cross-section according to line II—II of FIG. 1, at a larger scale;

FIG. 3 represents a cross-section according to line III—III of FIG. 2;

FIG. 4 is a cross-section according to line IV—IV of FIG. 1;

FIG. 5 is a cross-section according to line V—V of FIG. 1;

DETAILED DESCRIPTION OF THE PREFERRED EMBODIMENTS

Figure 6:
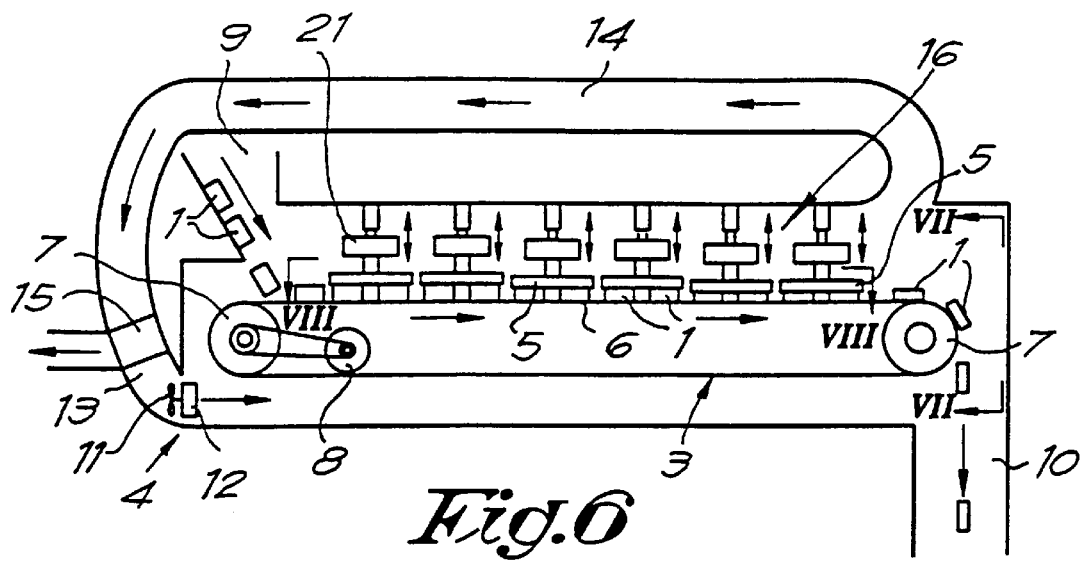
FIG. 6 is a longitudinal cross-section similar to that of FIG. 1, but relating to another embodiment of the apparatus according to the invention.

FIGS. 1 to 5 represent an apparatus for dehydrating food products in the form of small solid pieces 1 having more or less equal thickness. The apparatus comprises a closed housing 2 in which a conveyor 3 for transporting pieces 1 in a transport direction is provided, a hot gas stream device 4 arranged to create a hot gas stream in housing 2 along conveyor 3, and diffusers of ultrasonic waves in the form of diffusing plates 5 which are mounted above conveyor 3.

Conveyor 3 comprises a horizontal, perforated endless belt 6 moving around rollers 7. At least one of rollers 7 is driven by a belt driving device or roller motor 8.

Housing 2 forms a horizontal tunnel provided with an inlet 9 for pieces 1 which opens above one extremity of endless belt 6 and an outlet 10 for the dehydrated pieces which is located beneath the other end of endless belt 6.

Hot gas stream device 4 arranged to create a hot gas stream in the housing comprises a fan 11 and a heating element 12 in a gas inlet 13 in a lower part of housing 2 on the side of housing inlet 9, and a recirculating conduit 14 for the evacuation of humid air which is connected to an upper part of housing 2. Recirculating conduit 14 passes through a moisture separator 15 and is connected to gas inlet 13.

Each diffusing plate 5 is part of an ultrasonic wave emitting system 16 comprising, apart from diffusing plates 5, an ultrasonic wave generator 17 formed, for example, of a piezoelectric or magnetostrictive element, and a mechanical amplifier 18 formed, for example, of a horn between generator 17 and diffusing plate 5.

As shown in detail in FIGS. 2 and 3, diffusing plates 5, which, for example, are round, have contact surfaces which are smooth and show a discontinuous profile, namely grooves 19 on opposing surfaces. The removal of material at the internodal zones, i.e. the grooves on the opposing surfaces, allows the distribution of the amplitude of the vibrations to be modified in such a manner that the flat contact surfaces of diffusing plates 5 vibrate at a uniform amplitude level, resulting in a uniform effect on pieces 1.

In fact, ultrasonic wave emitting systems 16 are a variant of the systems described in EP-A-450.030, the relief of diffusing plates 5 being situated solely on the opposing surfaces thereof.

Systems 16 are mobile, such that they move along with a top part of endless belt 6. To this end, generators 17 are suspended in trolleys guided in a support structure 20 mounted above conveyor 3 in housing 2, and, as represented by the arrows in FIG. 5, are driven by a driving device, not represented in the figures, according to a closed circuit, a part of which is parallel to the top part of endless belt 6.

Each ultrasonic wave emitting system 16 is mounted on its trolley in such a manner that it may exert a slight static pressure upon the solid parts on conveyor 3, either by its own weight or under the influence of a device such as a spring, pushing the systems downward, individually or in groups.

Systems 16 are supplied with electric energy by an electronic control system so as to ensure an adequate frequency of diffusing plates 5. This frequency is influenced by the direct contact of diffusing plates 5 with pieces 1 to be dehydrated.

The dehydration of solid food pieces 1 takes place as follows:

Pieces 1 to be dehydrated are introduced through housing inlet 9 and are spread in rows in a single layer on the top part of conveyor 3.

These pieces are held between this top part and diffusing plates 5 which diffuse the ultrasonic waves.

These waves cause rapid successive contractions and expansions of the material of pieces 1. With each contraction, a very small amount of water is expelled towards the surface of the pieces where this water is evaporated by the hot gas stream having a temperature of less than 60° C., for example, of approximately 25° C. The temperature of the gas and its flow rate are adjusted by heating element 12 and fan 11. This gas passes through the openings in endless belt 6.

Little by little, as the pieces are dehydrated, their thickness diminishes, but the contact between a diffusing plate 5 and these pieces remains guaranteed, given the mounting of a corresponding system 16 which continues to exert a pressure on the pieces.

Upon arriving at the other extremity of conveyor 3, dehydrated pieces 1 drop into housing outlet 10 and are evacuated.

The moisture-loaded gas is evacuated through recirculation conduit 14 and recycled in housing 2 after being dried in moisture separator 15 and reheated by heating element 12.

Due to the continuous or even increasing static pressure as the dehydration is carried out, the contact between diffusing plates 5 and the pieces remains guaranteed and the pieces are gently compressed into the shape of flat discs. The retention time of pieces 1 in the housing may be extremely short.

The viscoelastic nature of the food products and the hydrodynamic pressure of the residual moisture in the pieces support the delicate tissues of the food products and prevents irreversible transformations. The more these tissues are compressed, the better a medium they form for a treatment of diffusion of ultrasonic waves.

The dehydrated pieces are perfectly smooth and flat. Due to the rather low temperatures during dehydration and the rather short treatment time, the qualities, such as color, taste, rehydration quality and nutritional value of the dehydrated food products remain unaltered.

The energy required for the treatment is minimal.

It is clear that, instead of being continuous, the movement of the pieces during the dehydration may be discontinuous.

In this latter case, systems 16 may be stationary in the transport direction of conveyor 3.

Figure 7:
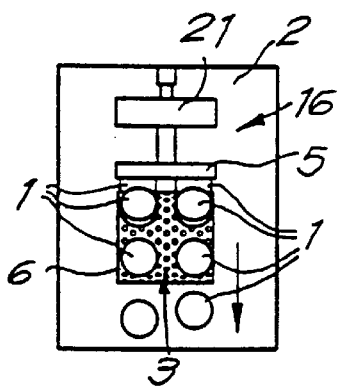
FIGS. 7 and 8 are cross-sections according to lines VII—VII and VIII—VIII of FIG. 6.
Figure 8:
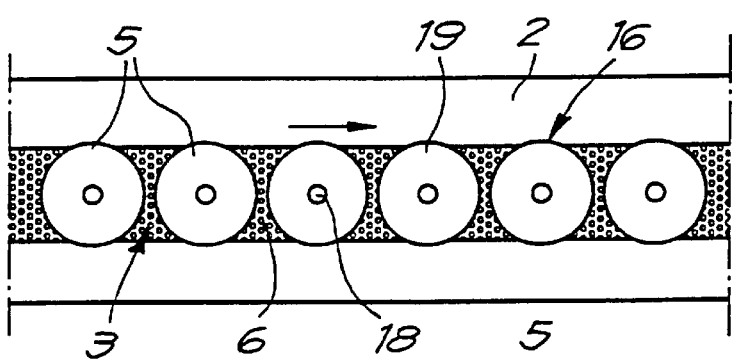

FIGS. 6 to 8 relate to a similar apparatus which differs from the apparatus according to FIGS. 1 to 5 in that the generators are not mobile and not supported by a single supporting structure 20, but are supported individually or as a group by a plurality of supporting structures 21 which are stationary in the transport direction of conveyor 3, but may be moved in height with respect to conveyor 3, for example, by hydraulic or pneumatic devices.

In fact, the distance between diffusing plates 5 and conveyor 3 diminishes little by little as the diffusing plates approach housing outlet 10.

In this way, diffusing plates 5 are maintained in contact with pieces 1 and a pressure is maintained on pieces 1 during their dehydration.

Conveyor 3 is driven intermittently. During each movement of conveyor 3, the generators are brought into a raised position, after which they are lowered on pieces 1 which have been moved from one system 16 or groups of systems 16 to another one.

No pieces of food products may become encrusted in the grooves or cavities of the plates since the contact surfaces thereof are flat and smooth.

The pressure exerted by the diffusing plates is limited such that the pieces do not stick to these plates.

When another food product is treated in the apparatus, the diffusing plates may be cleaned.

It is clear that numerous modifications may be made to the above-described examples without leaving the scope of the invention.

In particular, plates 5 diffusing the ultrasonic waves do not necessarily have to be round. They have another appropriate shape, for example, the shape of a rectangle or a square.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. A method for dehydrating solid products containing moisture, comprising the steps of:
   guiding a hot gas stream over solid products to be dehydrated; simultaneously subjecting the products to ultrasonic waves; and
   diffusing the ultrasonic waves in the products by vibrating plates which are brought into direct contact with the products.

2. The dehydration method according to claim 1, wherein the hot gas stream has a temperature lower than 60° C.

3. The dehydration method according to claim 1, wherein a static pressure is exerted on the products by the plates.

4. The dehydration method according to claim 3, wherein the hot gas stream has a temperature lower than 60° C.

5. An apparatus for dehydrating solid products containing moisture, comprising:
   a closed housing;
   at least one conveyor mounted in said housing, said conveyor arranged to transport said products in a transport direction;
   a hot gas stream device in communication with said housing, said hot gas stream device arranged to create a hot gas stream over solid products to be dehydrated; and
   an ultrasonic wave emitting system mounted in said housing to cooperate with said conveyor, said ultrasonic wave emitting system arranged to direct ultrasonic waves over said products, said ultrasonic wave emitting system including a plurality of ultrasonic diffusing plates, said diffusing plates being connected to ultrasonic wave generators and having first surfaces in direct contact with said products.

6. A dehydration apparatus according to claim 5, wherein said diffusing plates are mounted such that said diffusing plates exert a pressure on said products.

7. A dehydration apparatus according to claim 6, wherein said diffusing plates are stationary relative to said transport direction of said conveyor and are adjustable in distance from said conveyor.

8. A dehydration apparatus according to claim 6, wherein said diffusing plates are movable relative to said transport direction of said conveyor and have a driving device arranged to move said diffusing plates at the same speed as said products are transported by said conveyor.

9. A dehydration apparatus according to claim 6, wherein said conveyor comprises a perforated endless belt and a belt driving device.

10. A dehydration apparatus according to claim 6, wherein said ultrasonic wave emitting system further includes an ultrasonic wave generator and a mechanical amplifier disposed between said ultrasonic wave generator and said diffusing plates.

11. A dehydration apparatus according to claim 6, wherein each of said diffusing plates has a discontinuous profile with a relief on at least one plate surface.

12. A dehydration apparatus according to claim 11, wherein each of said diffusing plates has an opposing surface opposite said first surface of each of said diffusing plates, said first surface being smooth and said opposing surface having said relief in the form of a rib which is obtained by removing material at an internodal zones.

13. A dehydration apparatus according to claim 5, wherein said diffusing plates are stationary relative to said transport direction of said conveyor and are adjustable in distance from said conveyor.

14. A dehydration apparatus according to claim 5, wherein said diffusing plates are movable relative to said transport direction of said conveyor and have a driving device arranged to move said diffusing plates at the same speed as said products are transported by said conveyor.

15. A dehydration apparatus according to claim 5, wherein said conveyor comprises a perforated endless belt and a belt driving device.

16. A dehydration apparatus according to claim 5, wherein said ultrasonic wave emitting system further includes an ultrasonic wave generator and a mechanical amplifier disposed between said ultrasonic wave generator and said diffusing plates.

17. A dehydration apparatus according to claim 5, wherein each of said diffusing plates has a discontinuous profile with a relief on at least one plate surface.

18. A dehydration apparatus according to claim 17, wherein each of said diffusing plates has an opposing surface opposite said first surface of each of said diffusing plates, said first surface being smooth and said opposing surface having said relief in the form of a rib which is obtained by removing material at internodal zones.

* * * * *